April 6, 1948.　　　R. A. WOLF ET AL　　　2,439,196
PNEUMATIC AIRCRAFT FLOAT
Filed Aug. 27, 1945　　　3 Sheets-Sheet 1

INVENTORS
ROBERT A. WOLF & LUELL M. GRAHAM
BY

Beau, Brooks, Buckley & Beau.　ATTORNEYS

April 6, 1948.  R. A. WOLF ET AL  2,439,196
PNEUMATIC AIRCRAFT FLOAT
Filed Aug. 27, 1945  3 Sheets-Sheet 2
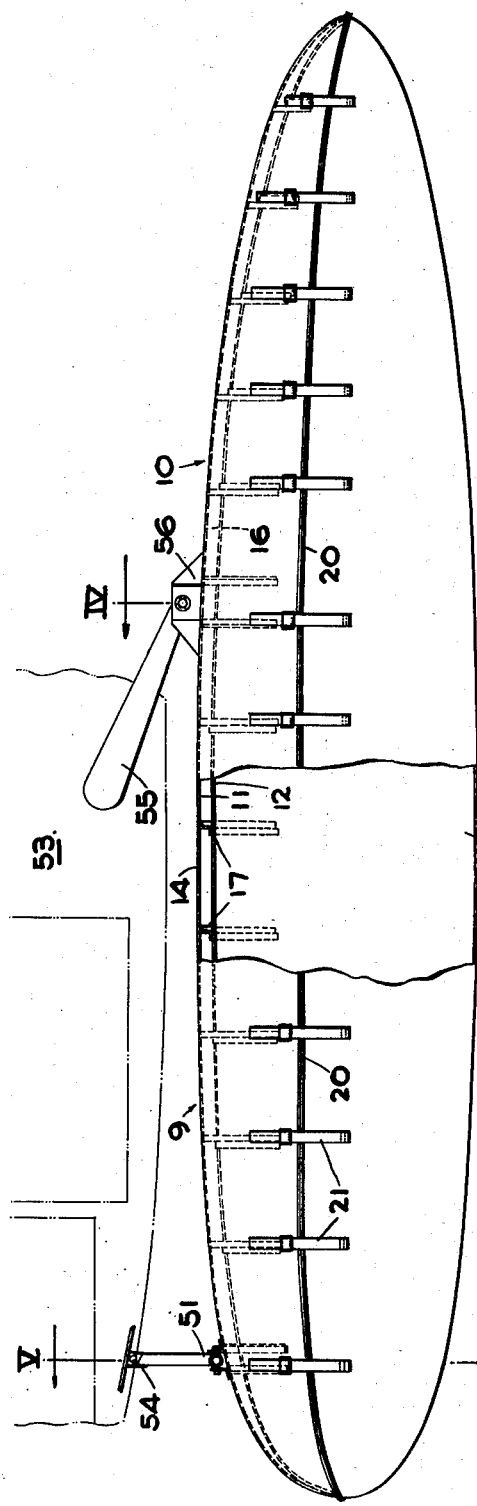
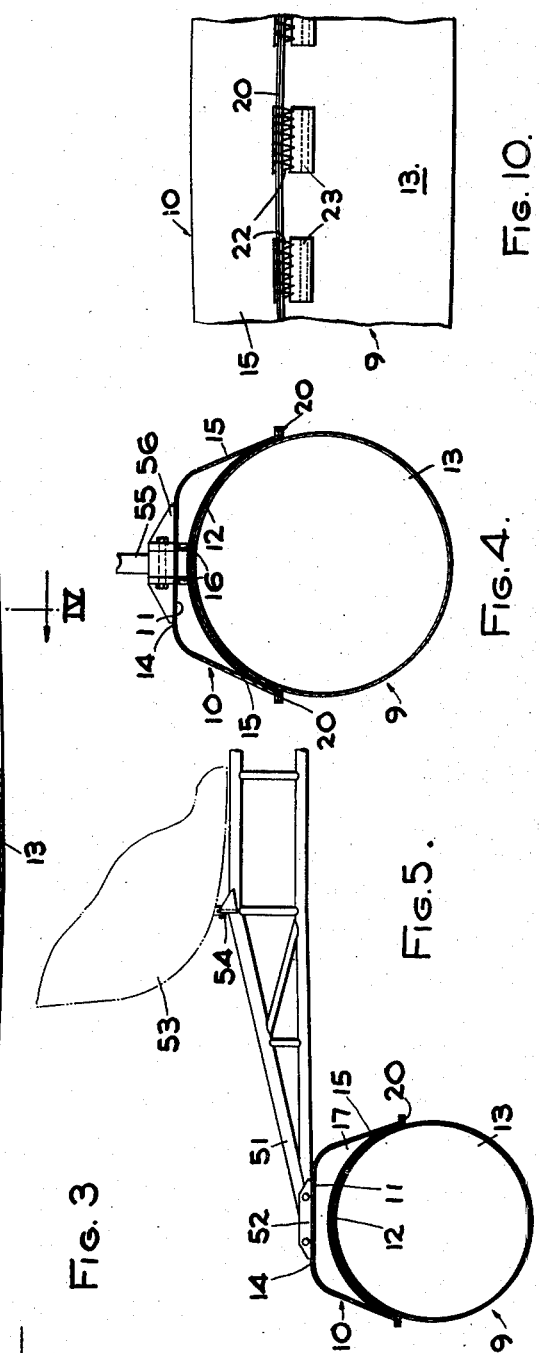
INVENTORS
ROBERT A. WOLF & LUELL M. GRAHAM
BY
Bean, Brooks, Buckley & Bean.
ATTORNEYS

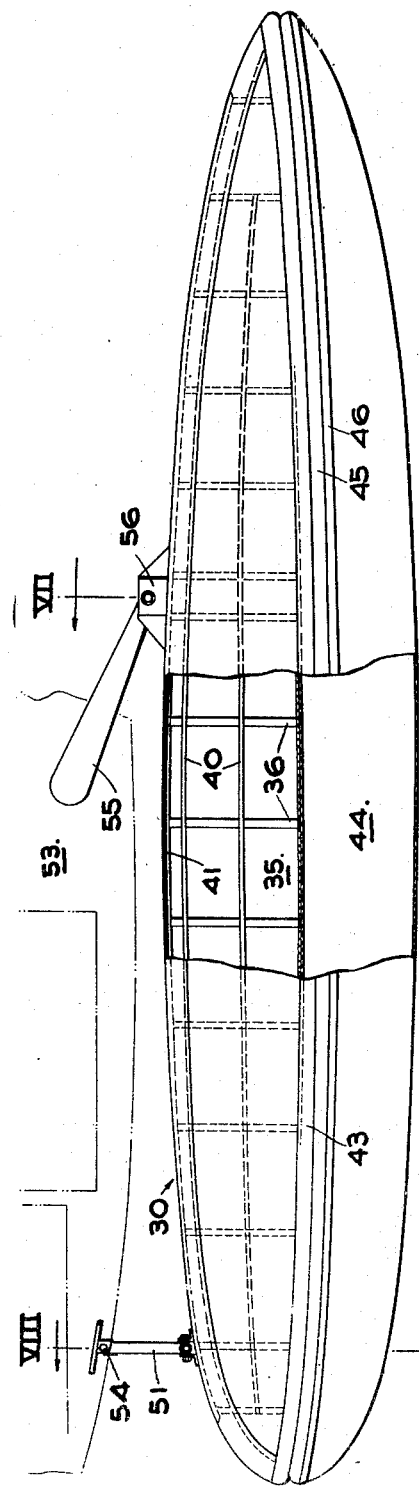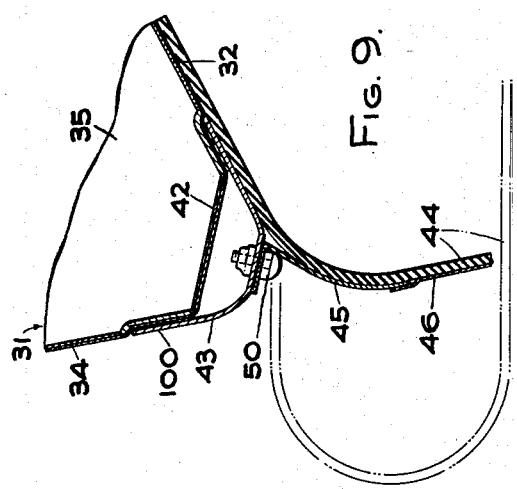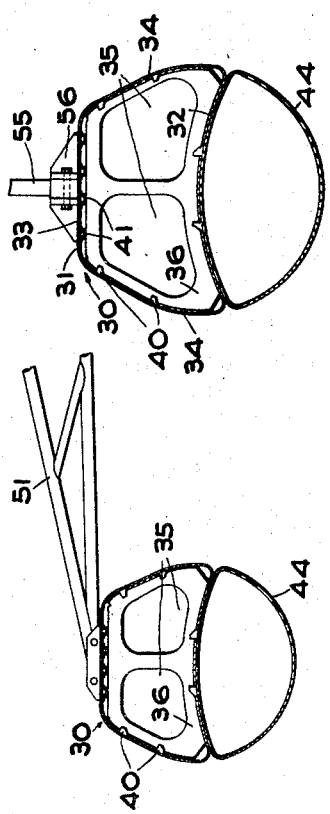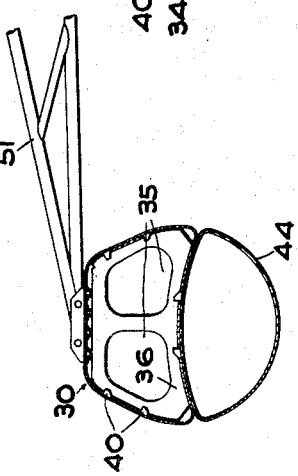

Patented Apr. 6, 1948

2,439,196

UNITED STATES PATENT OFFICE 2,439,196

PNEUMATIC AIRCRAFT FLOAT

Robert A. Wolf, Eggertsville, and Luell M. Graham, Williamsville, N. Y., assignors to Bell Aircraft Corporation, Wheatfield, N. Y.

Application August 27, 1945, Serial No. 612,746

5 Claims. (Cl. 114—66.5)

Our invention relates in general to aircraft landing gear and in particular to pneumatic floats and/or ground contact gear for aircraft of the rotary wing types.

Pneumatic floats or pontoons of present day design are usually of cylindrical shape with many protrusions for connections to load carrying members, and not only have very poor aerodynamic characteristics but also are not satisfactory because of their tendencies to vibrate and wobble and otherwise perform unsatisfactorily in response to periodic rotor forces and the like such as are encountered in rotary wing aircraft operations, especially while the aircraft is grounded with the rotor idling.

The principal object of our invention has been to overcome the above disadvantages and to provide an undercarriage suitable for either amphibious or land based aircraft which includes a pneumatic cell so arranged as to have its shape accurately controlled and maintained in an aerodynamically preferred form.

Another object has been to provide an aircraft landing gear including pneumatic means; the gear being so designed as to provide either for full water buoyancy or for only partial water buoyancy, and enabling the designer to control the shock absorption and vibration characteristics of the entire device.

Another object has been to provide a float which is primarily elastic but is fitted with a rigid upper load-carrying structure whose shape may be designed to have satisfactory aerodynamic characteristics and which structure shall so support the elastic portion of the float as to maintain and stabilize it at all times in an aerodynamically preferred and suitable load-supporting shape.

Moreover, where a greater factor of safety is desired, our invention may be made to have its rigid portion constructed so as to be self-buoyant, such structure having an elastic pneumatic bumper secured to its lower surface to act as a shock absorber cell and/or to add buoyancy to the composite landing gear device. The ratio of the sectional extent of the rigid portion to the elastic portion will govern the vibration frequency characteristics of the composite structure, and predetermination in this manner of the frequency characteristics of the landing gear will enable the designer to provide an aircraft which is stable and substantially vibration-free when resting upon a landing surface with the rotor in operation.

Another object has been to provide an amphibious float or pontoon which will reduce the shock of impact of a rotary wing type aircraft when landed either vertically or horizontally upon water or solid surfaces.

The above objects and advantages have been accomplished by the device shown in the accompanying drawings, of which:

Fig. 3 is an enlarged side elevation of one form of our invention;

Fig. 4 is a sectional view thereof taken on line IV—IV of Fig. 3;

Fig. 5 is a similar sectional view taken on line V—V of Fig. 3;

Fig. 6 is an enlarged side elevation of a modified form of invention;

Fig. 7 is a sectional view thereof taken on line VII—VII of Fig. 6;

Fig. 8 is a similar view taken on line VIII—VIII of Fig. 6;

Fig. 9 is a greatly enlarged fragmentary sectional view taken on line IX—IX of Fig. 6; and Fig. 10 is a fragmentary view of a modified form of method attaching the pneumatic cell of Fig. 3 to the cap thereof.

Figure 1:
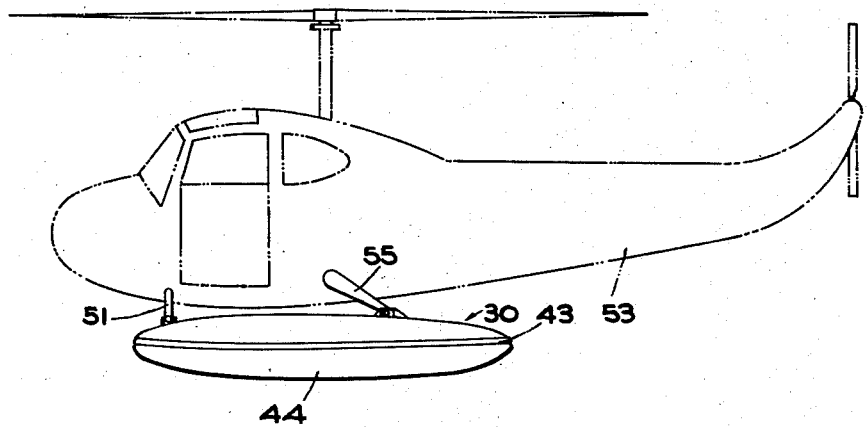
Fig. 1 shows a side elevation of a rotary wing aircraft showing our invention in use.

Referring now to the form of invention shown in Figs. 1–5, inclusive, which is the form designed primarily for buoyancy and maximum absorption of shock and vibration, the float 9 comprises a metal cap 10. This cap may be externally contoured in any preferred aerodynamic shape and is formed with a curved top wall 11 and a bottom wall 12. The bottom wall is preferably concave and shaped to fit the cylindrical periphery of the pneumatic cell 13, as clearly shown in Figs. 4 and 5. The top wall is provided with a flat upper portion 14 and two depending side portions 15, joined at the lower edges by suitable means to the edges of the bottom wall 12. The top and bottom walls 11 and 12 are reinforced by a number of longitudinally extending channels 16, and by a series of spaced laterally arranged bulkheads 17. The lower edges of the depending side portions 15, as well as the attached edges of the bottom wall 12 are flared outwardly in the formation of a flange 20 which extends around the entire cap 10 of the float.

As hereinabove stated, the cap is designed so as to be streamlined in shape, and the cell 13 is made to complement the cap 10 to provide in combination therewith an overall streamlined landing gear element. The cell 13 is secured to the inside surface of the wall 12 by any suitable means, for example, by cementing it to the inside surface of the bottom wall 12 and further by being attached to the depending side members by means of straps 21, or to the flanges 20 as shown in Fig. 10, by means of lacings 22. These lacings pass through reinforcing strips 23 secured at suitable intervals to the side of the pneumatic cell, and through perforations formed in the adjacent portions of the flange 20. The flange 20 not only provides means for the lacing of the fastening means, but also presents a rounded edge to the cell 13 which prevents abrasion or cutting thereof along the line of contact with the lower edges of the cap.

The form of invention shown in Figs. 6–9, inclusive, is one designed to have a portion or all of its water buoyancy provided by the rigid cap. The elastic cell in this form may be provided either as a bumper means for absorbing shock in landing and to enable the designer to control the vibration characteristics; or it may be made pneumatic to add buoyancy to the float, if desired. In this form of the invention, the cap 30 is formed with a top wall 31 and a bottom wall 32. The top wall is formed with a flat upper portion 33 and with depending side portions 34. The top and bottom walls are spaced apart a considerable distance and form an air tight chamber 35 whereby the cap is given buoyancy characteristics. Perforated bulk heads 36 are arranged transversely of the cap; and it is further reinforced by stringers 40 extending longitudinally along the side walls. Stringers 41 serve to reinforce the flat upper portion 33.

The bottom wall 32 is joined to the side portions 34 of the top wall 31 by means of corner pieces 42 which are united to the bottom wall and side portion of the top wall in air tight manner. A buffer member 43 is extended around the edge of the cap and is suitably united to the corner member 42. The edge contour of the buffer member is curved so as to form a rounded surface for shape-restraining contact of the pneumatic cell 44 when it is compressed, as in connection with an aircraft landing operation.

The cap 30 of this form of the invention is also made of streamlined shape, and complements the pneumatic cell 44 to provide a unit which is of generally circular cross section. Since the bottom wall 32 is spaced from the upper wall a considerable distance, the cell-contacting surface is relatively shallow and is formed to a radius much larger than the radius of the outer contour of the float unit. The lower surface of the cell has a radius substantially the same as the radius of the outer contour of the float unit. The pneumatic cell 44 is preferably secured to the buffer member 43 by means of a fastening strip 45 which extends around the buffer member having its upper edge portion folded upon itself and secured to the member by means of bolts 50. The lower edge portion of the strip is secured to the cell 44 by any suitable means such as cement, and the edge may be reinforced by means of a tape member 46.

Figure 2:
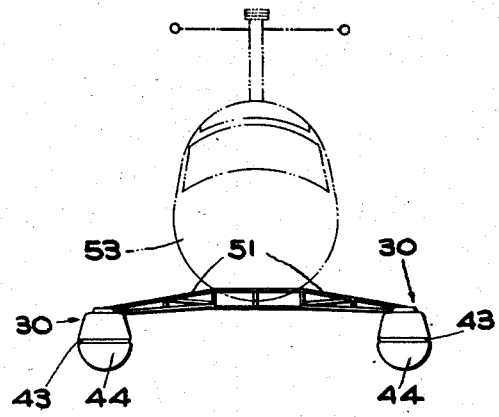
Fig. 2 is a front elevation of the same.

As shown in Figs. 1 and 2, two floats 9 may be used on each aircraft. In such case each float is carried at one end of a strut 51 by being secured to an upstanding flange 52 carried by the top wall 11 of the cap 10 or by the top wall 31 of the cap 30. The strut member is suitably secured to the fore part of the fuselage 53 of the aircraft by means of brackets 54, and each float is shown also secured aft to the aircraft by means of an arm 55. The inner end of this arm passes through and is secured to a suitable bracket 56 carried also by the walls 11 and 31.

Thus it will be understood that the invention provides an improved landing gear structure providing in each case a rigid element and an elastic element, the rigid element being adapted to support the elastic element and to maintain the latter under all operational conditions in the preferred shape thereof and to resist tendencies of the elastic element to vibrate in consonance with the natural periods of vibration of the aircraft rotor and engine and structural units, thereby avoiding undesirable vibration and wobbling of the entire aircraft.

While we have shown and hereinabove described the resilient element as being of pneumatic construction, it will be understood that any elastic material might be used in place thereof, such as for instance, sponge rubber or the like. Also it will be understood that although only a few forms of the invention have been shown and described in detail, it will be apparent to those skilled in the art that the invention is not so limited but that various changes may be made therein without departing from the spirit of the invention or the scope of the appended claims.

What is claimed is:

1. A float for an aircraft comprising in combination a rigid buoyant cell and a pneumatic cell, said rigid cell having an upper wall, a spaced lower wall, fastening means carried by said upper wall for securing said rigid cell to the aircraft structure, said lower wall being concave so as to give shape-sustaining support to said pneumatic cell, a corner piece at the joining edges of said upper and lower walls, a buffer member secured at its edges to said corner piece, and a fastening strip carried by said member and secured along one edge to said pneumatic cell.

2. A float for an aircraft comprising in combination a rigid cell and a pneumatic cell, said rigid cell having an upper wall, a spaced lower wall, fastening means carried by said upper wall for securing said rigid cell to the aircraft structure, said lower wall being concave so as to give shape-sustaining support to said pneumatic cell, the contiguous edges of said upper and lower walls being formed in an outwardly flaring buffer flange, and means for securing said pneumatic cell to said lower wall.

3. A float for an aircraft comprising in combination a rigid cell and a pneumatic cell, said rigid cell having an upper wall, a spaced lower wall, fastening means carried by said upper wall for securing said rigid cell to the aircraft structure, said lower wall being concave so as to give shape-sustaining support to said pneumatic cell, the contiguous edges of said upper and lower walls being formed in an outwardly flaring buffer flange, and detachable fastening means for removably securing said pneumatic cell to said lower wall.

4. A float for an aircraft comprising in combination a rigid buoyant cell and a pneumatic cell, said rigid cell having an upper wall, a spaced lower wall, fastening means carried by said upper wall for securing said rigid cell to the aircraft structure, said lower wall being concave so as to give shape-sustaining support to said pneumatic cell, means for joining said upper and lower walls, a buffer member adjacent said joining means, and means for fastening said pneumatic cell to said buffer member.

5. A float for an aircraft comprising in combination a rigid buoyant cell and a pneumatic cell, said rigid cell having an upper wall, a spaced lower wall, fastening means carried by said upper wall for securing said rigid cell to the aircraft structure, said lower wall being concave so as to give shape-sustaining support to said pneumatic cell, means for joining said upper and lower walls, a buffer member adjacent said joining means, said buffer member having a convex exterior surface for contact with said pneumatic cell, and means for securing said pneumatic cell to said corner piece.

ROBERT A. WOLF.
LUELL M. GRAHAM.

REFERENCES CITED

The following references are of record in the file of this patent:

UNITED STATES PATENTS

| Number | Name | Date |
|---|---|---|
| 1,317,741 | Turnbull | Oct. 7, 1919 |
| 1,489,619 | Tsavaris | Apr. 8, 1924 |
| 1,865,749 | Fleet | July 5, 1932 |
| 2,349,584 | Arnstein | May 23, 1944 |
| 2,375,973 | Cooper | May 15, 1945 |